Feb. 7, 1961
M. V. SKILLINGS
2,970,488
CONTROL SYSTEM
Filed Jan. 3, 1958
2 Sheets-Sheet 1
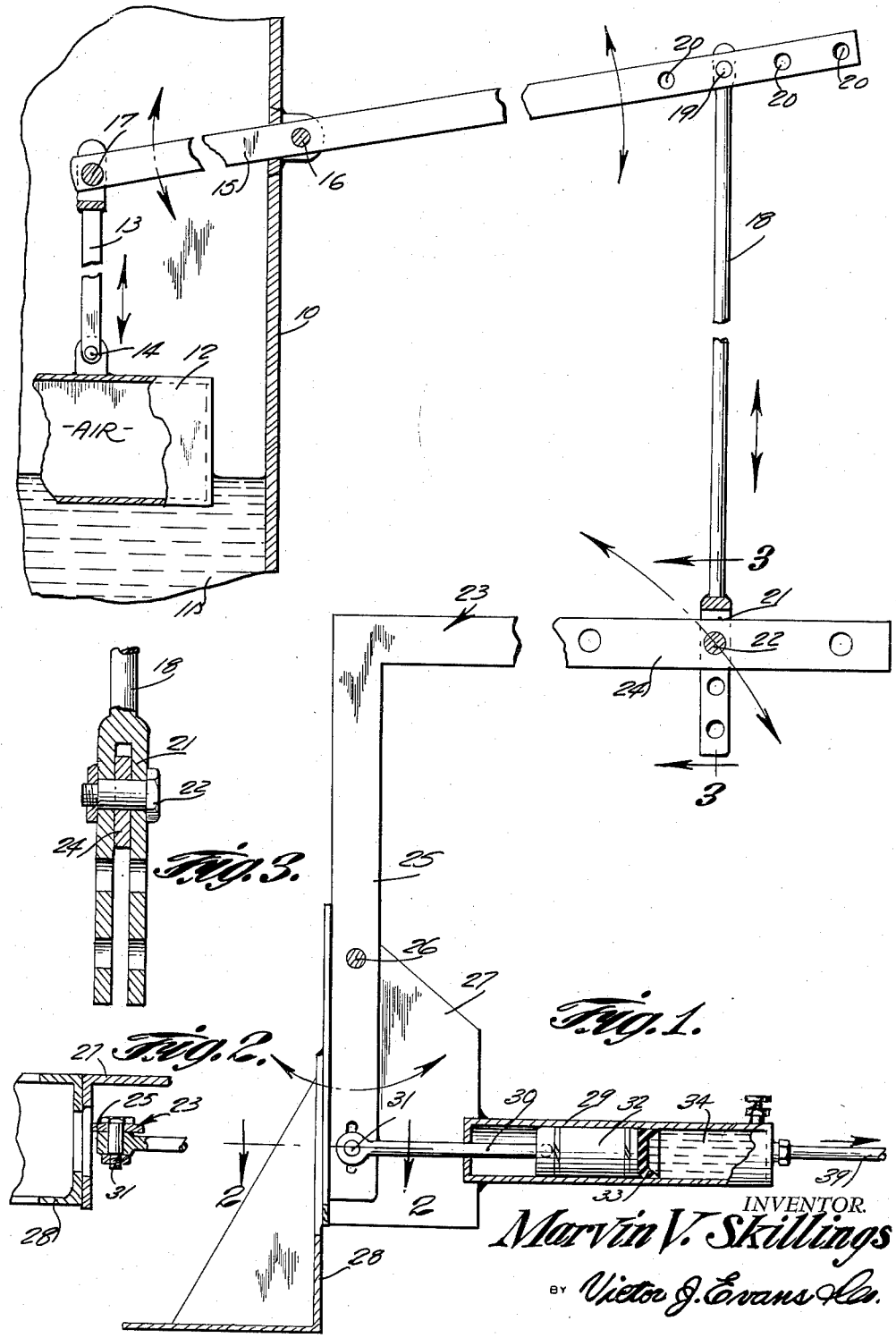
INVENTOR.
Marvin V. Skillings
BY Victor J. Evans Co.
ATTORNEYS

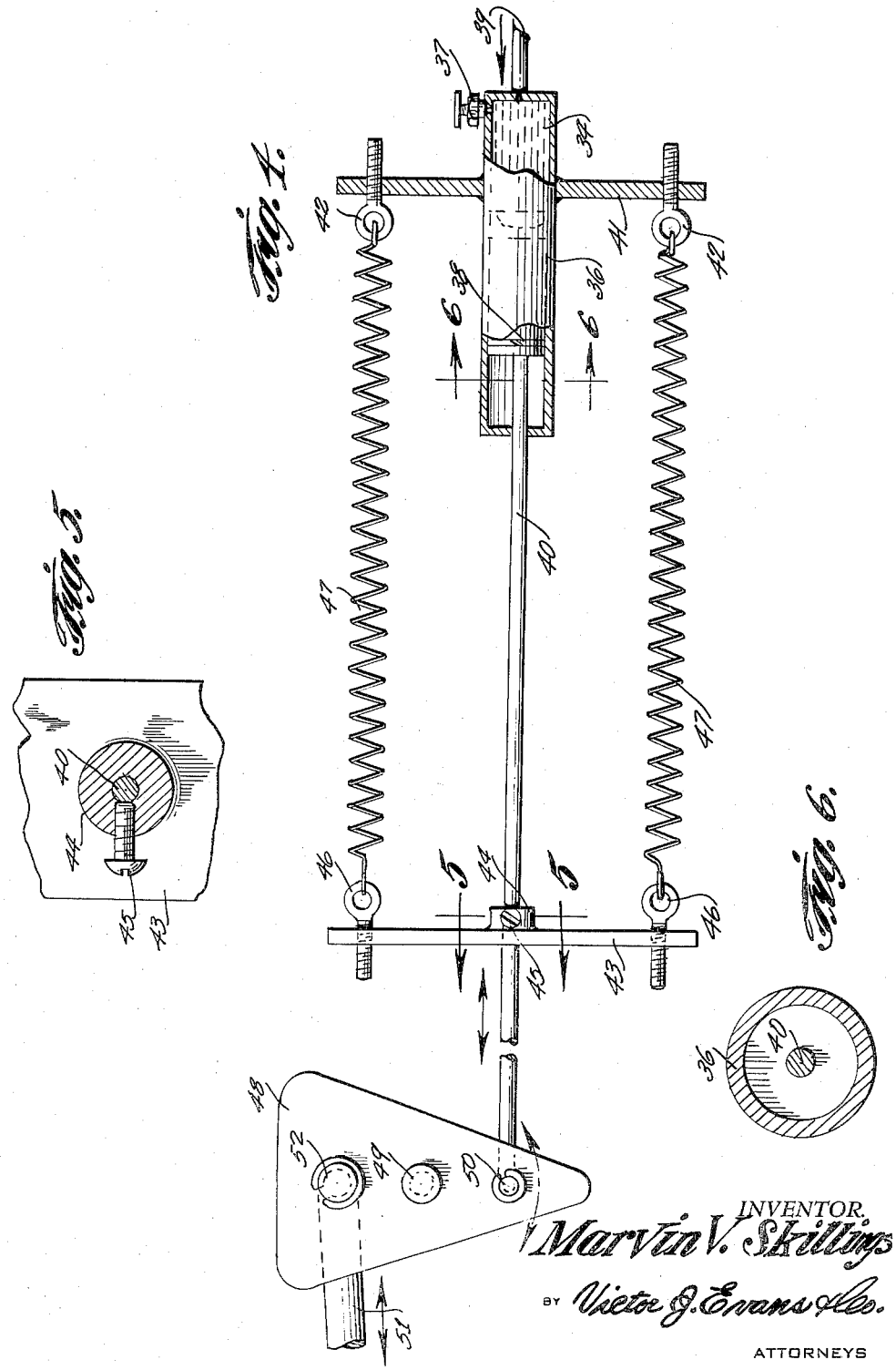

United States Patent Office 2,970,488
Patented Feb. 7, 1961

2,970,488

CONTROL SYSTEM

Marvin V. Skillings, Lance Creek, Wyo.

Filed Jan. 3, 1958, Ser. No. 707,032

2 Claims. (Cl. 74—110)

This invention relates to a control mechanism, and more particularly to a mechanism for controlling operation of an engine or motor in response to changing levels of liquid in a tank.

The object of the invention is to provide a control mechanism wherein a motor will be automatically actuated as the level of liquid in a tank changes, so that with the motor coupled to a pump, it will be seen that additional quantities of liquid can be pumped to the tank in order to replenish liquid which has been removed from the tank.

A still further object of the invention is to provide a flow control mechanism wherein a float is movably arranged in a tank having a supply of liquid therein, so that as the level of liquid decreases, the float will move downwardly and this will actuate a hydraulic system which in turn is connected to a throttle rod of an engine so that with the engine connected to a liquid or fluid pump, it will be seen that the engine can be speeded up to cause the pump to cause additional liquid to be pumped into the tank.

A further object of the invention is to provide a control mechanism which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a fragmentary elevational view, illustrating a portion of the control mechanism of the present invention, and with parts broken away and in section.

Figure 2 is a sectional view taken on the line 2—2 of Figure 1.

Figure 3 is a sectional view taken on the line 3—3 of Figure 1.

Figure 4 is a fragmentary elevational view, with parts broken away and in section, showing an additional portion of the control mechanism.

Figure 5 is a sectional view taken on the line 5—5 of Figure 4.

Figure 6 is a sectional view taken on the line 6—6 of Figure 4.

Referring in detail to the drawings, the numeral 10 indicates a tank which has a quantity of liquid 11 therein, Figure 1, and movably mounted in the tank 10 is a float 12. The numeral 13 indicates an arm which has its lower end connected to the float 12 as at 14, and the upper end of the arm 13 is pivotally connected to a lever 15 by means of a pivot pin 17. The lever 15 is pivotally connected to the tank 10 by means of a pivot member 16.

As shown in the drawings, the lever 15 is pivotally connected to the upper end of a link 18 by means of a pivot pin 19, and the lever 15 is provided with a plurality of openings 20 whereby the pin 19 can be extended through different of the openings 20 so as to permit adjustment of the parts when necessary.

The lower end of the lever 18 is bifurcated as at 21, Figure 3, and the numeral 22 indicates a pivot pin which connects the bifurcated portion 21 to a leg 24 of an L-shaped body member 23. The body member 23 further includes a second leg 25 which is pivotally connected to a stationary bracket 27 by means of a pivot pin 26, and the bracket 27 may be secured as by welding to a supporting device 28.

There is further provided a first hydraulic cylinder 29 which may be secured in a stationary manner to the bracket 27, and a shank 30 projects into the cylinder 29 and has its outer end pivotally connected to the leg 25 as at 31. A cup-like member 33 is arranged contiguous to a movable piston or plunger 32 which is arranged in the cylinder 29, and the piston 32 is connected to the inner end of the shank 30. The numeral 34 indicates the hydraulic fluid in the cylinder 29, and a drain valve may also be provided for the cylinder 29.

The numeral 36 indicates a second hydraulic cylinder which is spaced from the first cylinder 29, and a drain valve 37 is provided for the cylinder 36, Figure 4. The numeral 38 indicates a piston or plunger which is movably mounted in the cylinder 36, and a conduit 39 connects the cylinders 29 and 36 together. A movable rod 40 is connected to the piston 38.

The numeral 41 indicates a support member which is secured to the cylinder 36, and eye bolts 42 are connected to the support member 41. The numeral 43 indicates a plate which is provided with a hub 44 that has a screw member 45 extending therethrough, and the screw member 45 engages the rod 40 so as to lock the plate 43 on the rod 40. Eye bolts 46 are connected to the plate 43, and coil springs 47 extend between the eye bolts 42 and 46.

As shown in Figure 4, there is provided a base piece 48 which is pivotally supported as at 49, and one end of the rod 40 is pivotally connected to the base piece 48 as at 50. The numeral 51 indicates a throttle control member which is pivotally connected to the base piece 48 as at 52, and the throttle control member 51 leads to a conventional carburetor on an engine or motor, and wherein the engine is used for operating a conventional pump. Such a pump is adapted to be used for supplying liquid 11 to the tank 10.

From the foregoing, it is apparent that there has been provided a control mechanism which will automatically maintain the liquid 11 at the proper height or level in a tank such as the tank 10. In use, with the parts arranged as shown in the drawings, it will be seen that when the level of liquid 11 in the tank 10 drops, the float 12 will move downwardly and this will cause the arm 13 to pivot the lever 15 in a counterclockwise direction about the pin 16. As the lever 15 pivots in a counterclockwise direction, it raises the link 18 and this in turn causes counterclockwise pivotal movement of the body member 23 about the pin 26. As the body member 23 pivots, the shank 30 will move inwardly into the cylinder 29 and this will cause the piston 32 to exert pressure on the hydraulic fluid 34 so that this hydraulic fluid will transmit pressure through the conduit 39 to the cylinder 36. This will result in movement of the piston 38 from left to right in Figure 4 whereby the rod 40 will be similarly moved and this will cause pivotal movement of the base piece 48 in a clockwise direction about the pivot pin 49. This pivotal movement of the base piece 48 will cause movement of the throttle member 51 which is connected to a conventional carburetor of an engine or motor and such an engine is coupled to a conventional pump so that as the level of liquid 11 drops, the pump and motor will be speeded up so as to replace the liquid 11 in the tank 10. When the liquid 11 rises in the tank 10, the float 12 will move upwardly so that the reverse procedure will take place whereby the throttle member 51 will be moved in the opposite direction so as to slow the engine and pump down. Thus, it will be seen that there has been provided an automatic control means wherein an engine and pump are speeded up or slowed down as the level of the liquid 11 in the tank 10 changes or varies. Spring members 47 serve to return the parts such as the throttle member 51 and rod 40 to their neutral positions when pressure on the hydraulic fluid 34 is released. The tension of the spring 47 can be regulated by rotating the eye bolts 46. By loosening the set screw 45, the position of the plate 43 on the rod 40 can be changed, and this provides a further means of adjustment.

The parts can be made of any suitable material and in different shapes or sizes. Furthermore, the present invention can be used with any liquid supply system, and the liquid 11 may be of any desired composition and the control mechanism of the present invention will serve to regulate the motor and pump as the liquid level varies or changes.

The conduit 39 which connects the pair of cylinders together may be copper tubing.

According to the present invention, it will be seen that there has been provided a means for maintaining liquid at a uniform level in a tank or container, as has been selected by the speed of the motor. The float 12 moves up and down as the level of liquid raises or lowers and this operates the plungers which in turn serve to govern the motor through the carburetor control member 51. Thus, by means of a hydraulic mechanism, the liquid level will be maintained at the proper height in the tank and the control is effected through the carburetor on the motor. The springs 47 serve as return springs.

The above description of the invention is for illustrative purposes only and it is understood that modifications may be made in the construction within the scope and spirit of the following claims.

I claim:

1. In a control system, a tank having a quantity of liquid therein, a movable float in said tank, an arm extending upwardly from said float and connected thereto, a lever pivotally connected to said tank and having one end pivotally connected to the upper end of said arm, a link having its upper end pivotally connected to said lever and the lower end of said link being bifurcated, an L-shaped body member connected to the bifurcated end portion of said link, a stationary bracket providing a pivotal support for said body member, a first cylinder secured to said bracket, a shank having one end connected to said body member, a movable piston arranged in said cylinder and connected to said shank, a second cylinder spaced from said first cylinder, a second piston movably mounted in said second cylinder, a conduit connecting said first and second cylinders together and said conduit having hydraulic fluid therein, a rod connected to said second piston, a support member secured to said second cylinder, a plate mounted on said rod, eye bolts connected to said support member and plate, coil springs extending between said eye bolts and connected thereto, a pivotally mounted base piece connected to said rod, and a throttle control member connected to said base piece.

2. In a control system, a tank having a quantity of liquid therein, a movable float in said tank, an arm extending upwardly from said float and having its lower end connected thereto, a lever pivotally connected to said tank and having one end pivotally connected to the upper end of said arm, said lever being provided with a plurality of openings so as to permit adjustment of the parts when necessary, a link having its upper end pivotally connected to said arm and the lower end of said link being bifurcated, an L-shaped body member having a leg connected to the bifurcated end portion of said link, a stationary bracket providing a pivotal support for the other leg of said body member, a supporting device having said stationary bracket secured thereto, a first cylinder secured to said bracket and provided with a drain valve, a shank having one end connected to said body member, a movable piston arranged in said cylinder and connected to said shank, a second cylinder spaced from said first cylinder provided with a drain valve, a second piston movably mounted in said second cylinder, a conduit connecting said first and second cylinders together and said conduit having hydraulic fluid therein, a rod connected to said second piston, a support member secured to said second cylinder, a plate mounted on said rod, eye bolts connected to said suport member and plate, coil springs extending between said eye bolts and connected thereto, a pivotally mounted base piece connected to said rod, a throttle control member pivotally connected to said base piece, a hub extending from said plate, and a securing element extending through said hub and engaging said rod so as to selectively lock the plate on the rod.

References Cited in the file of this patent

UNITED STATES PATENTS

| | | |
|---|---|---|
| 1,383,936 | Guise | July 5, 1921 |
| 1,794,443 | Glacson | Mar. 3, 1931 |
| 1,875,803 | De Giers | Sept. 6, 1932 |
| 1,899,063 | Stoll | Feb. 28, 1933 |
| 2,070,489 | McMichen | Feb. 9, 1937 |